April 29, 1952  E. WILBUSHEWICH  2,594,529
FREEZING MACHINE

Filed Dec. 15, 1949  3 Sheets-Sheet 1

INVENTOR
EUGEN WILBUSHEWICH
BY
ATTORNEY

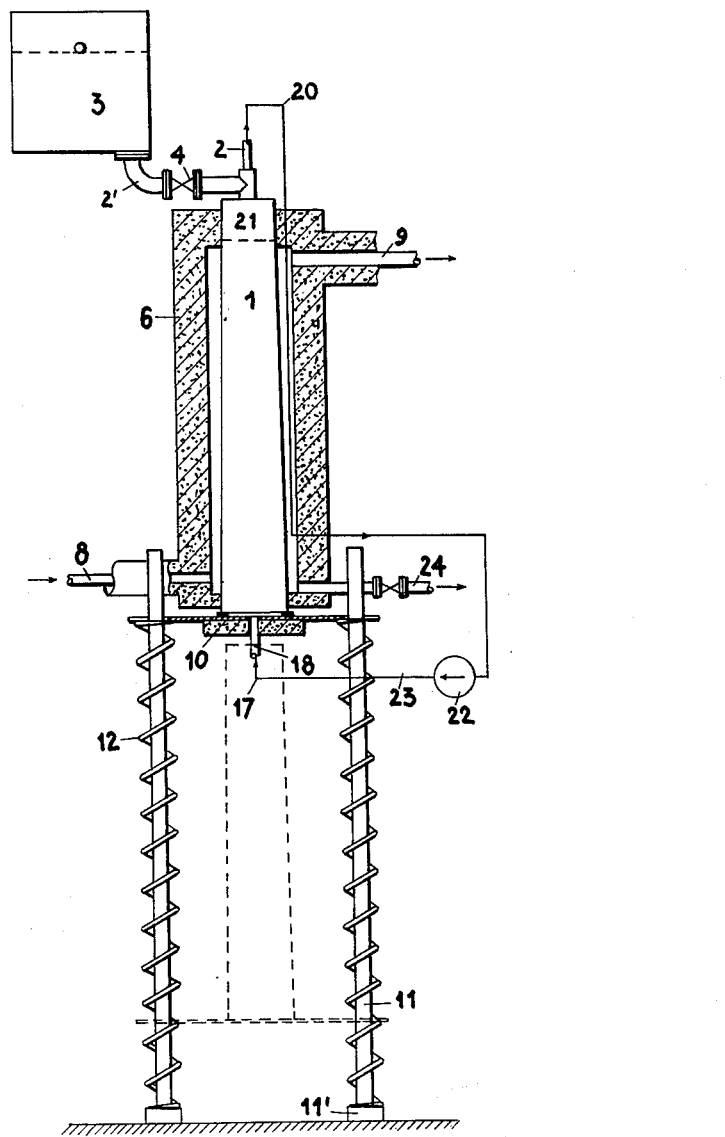

April 29, 1952  E. WILBUSHEWICH  2,594,529
FREEZING MACHINE
Filed Dec. 15, 1949  3 Sheets-Sheet 3
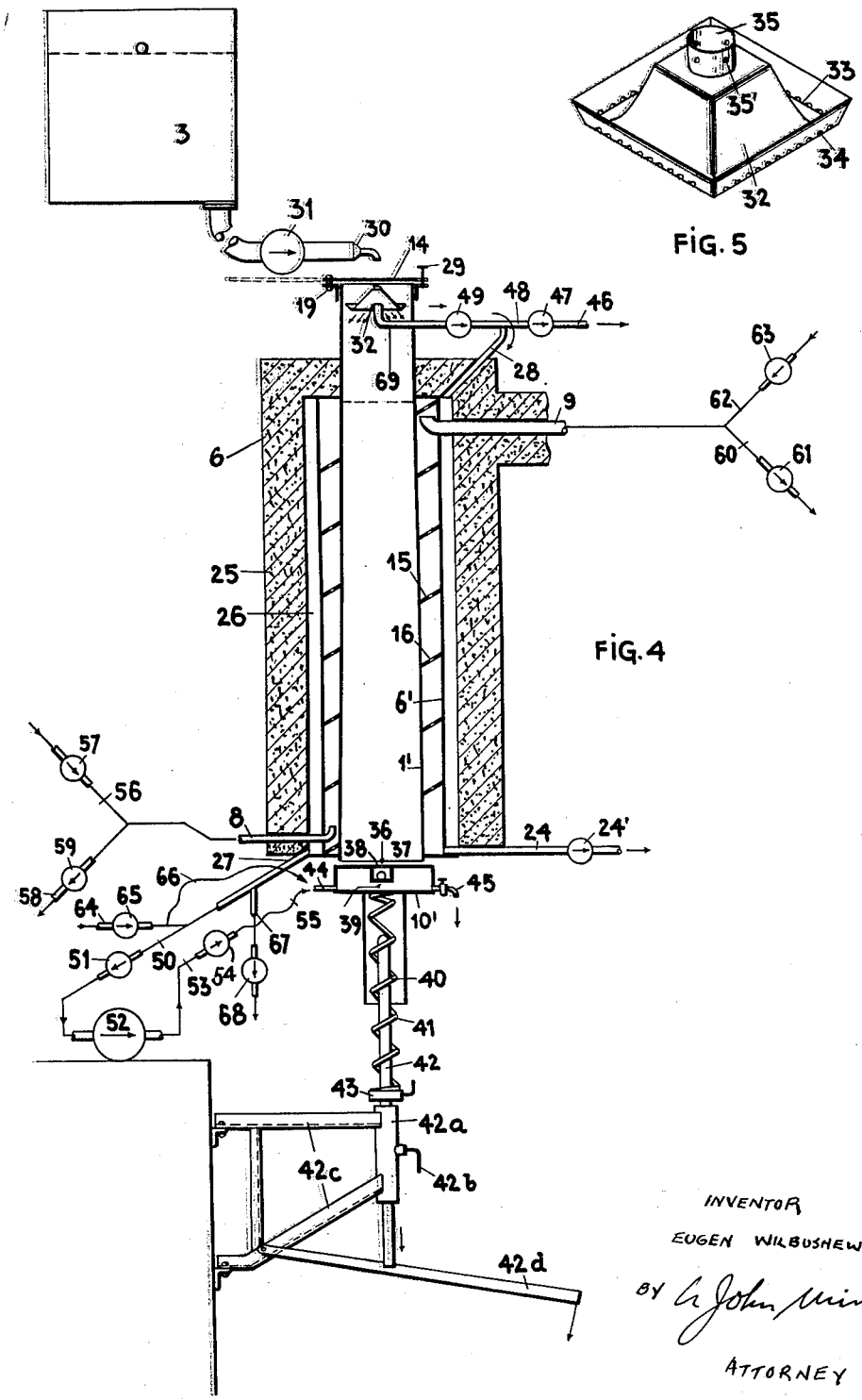
INVENTOR
EUGEN WILBUSHEWICH
BY [signature]
ATTORNEY

Patented Apr. 29, 1952　　　　　　　　　　　　　　　　　　　　　　　　　　2,594,529

UNITED STATES PATENT OFFICE 2,594,529

FREEZING MACHINE

Eugen Wilbushewich, Haifa, Israel

Application December 15, 1949, Serial No. 133,087
In Switzerland September 13, 1949

5 Claims. (Cl. 62—105)

This invention relates to freezing machines with direct exchange of heat between the refrigerant and the liquid to be frozen, i. e. without the use of a brine as intermediate carrier of cold. The invention concerns in the first line the manufacture of ice in blocks or cakes. It will be described hereinbelow in connection with ice-making and the terminology will be chosen accordingly. However, the freezing machine according to the invention has other applications as well, for example, in the chemical or food industries, and these are to be understood as being included in the invention as described and claimed herein.

The invention has as its main object to provide ice-making machinery in which the freezing period is drastically shortened and the harvesting of the ice simplified, facilitated, and accelerated.

The invention consists in a freezing machine operated by direct transfer of cold from the refrigerant to the liquid to be frozen, wherein one or more oblong cans are mounted upright within the evaporator of a refrigerating plant, and provided with bottoms arranged to be unconnectedly applied with pressure to the lower ends of the cans and to be lowered for the harvesting of the ice cakes.

Where several cans are placed in one and the same evaporator, they are preferably grouped in one or several rows, and one common bottom may be provided for all or some of them, allowing ice cakes to be harvested from all the cans at the same time and by one single operation.

By a further feature of the invention, the inner space of the evaporator round the can or cans is transversely subdivided by ribs having openings for the passage of the refrigerant. These ribs may form rings or spirals round each can.

It is further advantageous to provide means for passing air upwards through the cans, and also means for setting up a state of reduced pressure in the cans.

By a yet further feature of the invention, provision is made for warming the evaporator in order to loosen the cakes. Similarly, the bottom may be arranged to be warmed for the same purpose.

The invention is illustrated, by way of example only, in the accompanying drawings in which:

Fig. 3 is a cross-section of another ice-making machine according to the invention;

Fig. 4 shows in cross-section yet another embodiment of the invention;

Fig. 5 is a perspective view of a detail of the ice-making machine according to Fig. 4.

Figure 1:
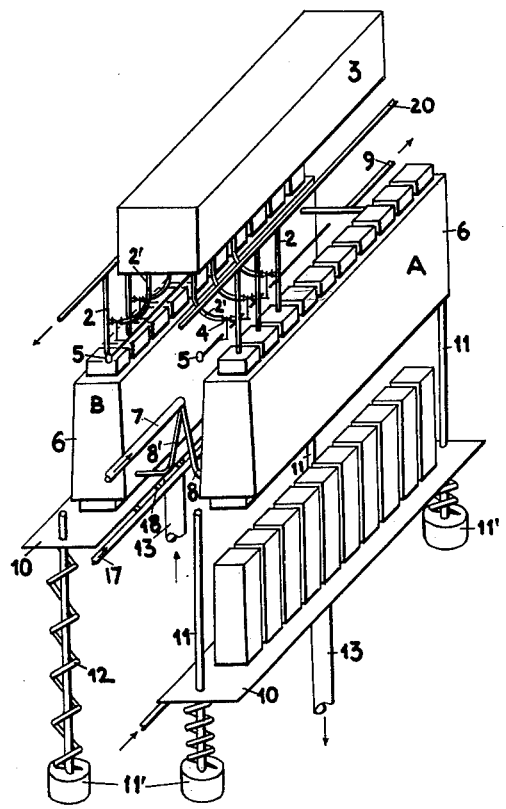
Fig. 1 is a diagrammatical perspective view of an ice-making machine according to the invention.
Figure 2:
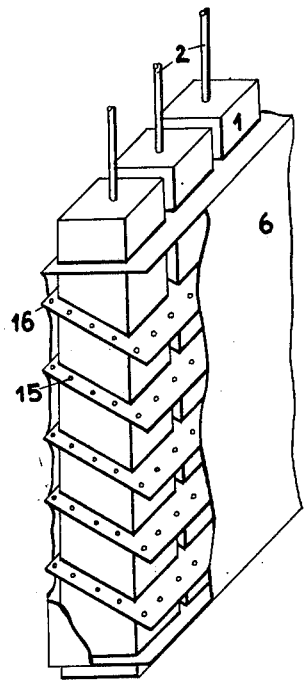
Fig. 2 is a fragmentary perspective view of a group of ice cans of an ice-making machine according to the invention.

Turning first to Figs. 1 and 2, the ice-making machine here shown comprises two operational groups A and B, consisting each of ten cans 1 arranged in a row in the inner space of an evaporator. The two evaporators are connected in parallel in the same refrigerating plant for alternate or simultaneous operation. The cans are made from metal and have the form of oblong frustrated pyramids with a rather small angle of inclination of their side walls. They project from the evaporators with both their top and bottom parts. Rising pipes 2 are connected to their top walls, and branch pipes 2', including each a valve 4 and laterally joining the pipes 2, connect an overhead water tank 3 with the individual cans for supplying them with water. The control members of all the valves 4 of either group are linked to a push rod 5 by means of which they can be opened or closed simultaneously and by one single operation.

The refrigerant is supplied to the machine through a main conduit 7 which is connected to the bottom parts of the evaporators by branch pipes 8, 8' respectively, including each a valve (not shown) for individual control. From the upper parts of the evaporators, the refrigerant leaves through a conduit 9 in order to be recirculated to the compressor of the refrigerating machine.

The bottom ends of the cans are open. To either group a common bottom is coordinated, which is unconnectedly applied with pressure from below against the cans and can be lowered for the harvesting of the ice cakes. Each such bottom is formed by a plate 10 guided at its ends on posts 11 fixed in socles 11'. Compression springs 12, wound round the posts, tend to press the bottom upwards. If for constructional or operational reasons it is preferred not to make the springs so strong that they can support by themselves the entire weight of the bottom when the cans are filled, or if it is preferred to omit the springs altogether, hydraulic, pneumatic or mechanic jacks, indicated in Fig. 1 by the lifting column 13, are provided for applying the bottom against the cans.

The evaporator space is transversely subdivided by cooling ribs 15 having openings 16 for the passage of the refrigerant. The ribs are welded to the cans and run round the latter either in rings or in spirals. They may lie in horizontal planes or, preferably, in inclined planes as shown in Fig. 2. It has been found that these ribs considerably intensify the evaporation of the refrigerant and hence the generation of cold, thereby accelerating the freezing process.

Agitation of the water until it freezes may be effected by passing an upward current of air therethrough. For this purpose, a compressed-air main 17 is attached to either bottom 10, and the bottom area beneath each can has an opening connected to the main 17 by a branch pipe 18. The air escapes from the cans through the rising pipes 2 into a collecting pipe 20 from which it may be re-circulated. Where the branch pipes 18 join the bottom, check valves are preferably arranged (as described below in connection with Fig. 4) for preventing the outflow of water when the air supply is shut off.

Fig. 1 shows the group B in operational position, and the group A with the bottom lowered for harvesting the ice cakes. The bottom 10 of group B is tightly applied against the bottom ends of the cans, valves 4 of the water supply pipes 2' are closed, the control valves of the refrigerant branch pipe 8' are open. In group A both valves 4 and the control valves of the refrigerant branch pipe 8 are closed. When the ice cakes have been collected from group A, the bottom is again raised, valves 4 are opened until the cans have been filled with water up to the proper level, then the valves 4 are closed and the refrigerant is admitted through branch pipe 8, and a fresh freezing cycle is started.

The ice cakes can be harvested more easily and rapidly if they are loosened by thawing. This may be effected thereby that conduit 9 is shut off while the branch pipe 8 (or 8', as the case may be) remains open. The refrigerant entering the evaporator does not expand and evaporate and quickly warms the evaporator. The pressure within the latter rises considerably during this operation, and the operator must take care not to allow it to exceed the limits of safety.

Turning now to Fig. 3, this shows an ice-making machine which is similar in principle to the one illustrated in Figs. 1 and 2 but includes some modifications. This machine has only one group of cans 1, which may either be pyramidal like in Figs. 1 and 2, or conical. The bottom 10 is guided at either end on two posts 11. The evaporator 6 has been shown to be well heat-insulated, as indeed it will be as a rule, and so are the refrigerant conduits 8 and 9. The evaporator space is transversely subdivided like in the first embodiment, but for the sake of simplification of the drawing the ribs have not been shown. This figure also indicates in a diagrammatical way an air circulation system. From the air spaces 21 above the water level in the cans, and through the rising pipes 2, the air passes into the collecting pipe 20, like in Fig. 1. The latter leads into a pipe 20' which traverses the evaporator space and leads to an air pump 22, thence via a pipe 23 to pipe 17 from which the air is distributed back to the single cans through pipes 18. This arrangement has the advantage that the air is cooled outside the cans and losses of cold are minimized. An oil drain 24 is connected to the bottom part of the evaporator.

The embodiment of the invention shown in Figs. 4 and 5 has been devised as a single-can machine but it is obvious that some of its features can as well be used in connection with multi-can machines, such as those described hereinbefore.

The freezing can 1' is located in the evaporator space 6' which is delimited by a metal wall 6'' and transversely subdivided by ribs 15 having openings 16. The evaporator in its turn is enclosed in a heat-insulating casing 25 comprising a jacket space 26. Heat-insulated conduits 8 and 9 connected to the evaporator space 6' serve as refrigerant inlet and outlet, respectively. An oil drain 24 with valve 24' is branched off from the bottom part of the evaporator space. The jacket space 26 has connections 27 and 28 whose purpose will be explained below.

The can has a lid 14 pivotable about a horizontal axle 19 and arranged to be secured in closing position by a locking member 29. The overhead water tank 3 has a tap 30 including a valve 31 and opens above the can. The latter contains in its top part a water distributor, being a hollow body 32 sloping on all sides (see also Fig. 5) towards a circumferential channel 33 provided with openings 34. The shape of the body 32 may be pyramidal, conical or the like. On its apex the distributor has a receiving cup 35 with outflow openings 35'. The water drops from the tap 30 into the cup 35 and runs down into the channel 33 from which it flows down mainly along the walls of the can.

The can bottom 10' is hollow, that is, it is formed by a flat box. It has in its top wall an air passage opening 36 and therebeneath a valve chamber 37 with ball valve 38, and an opening 39 in the bottom of the valve chamber. The ball valve prevents the outflow of water from the can into the bottom. The bottom also has an inlet connection 44 and an outlet connection 45 including a stop cock. A vertical sleeve 40 is secured to the lower wall of the bottom 10'. This receives the upper end of a compression spring 41 which is wound on a vertical rod 42 on which a collar 43 is slidably mounted, provided with means for locking it on the desired level. The rod 42 passes slidably through a vertical sleeve 42a and can be locked within the latter by means of a screw 42b. The sleeve 42a forms part of a bracket 42c which is hinged to the wall. A lever 42d is pivotally connected to the bracket and can be raised against the lower end of the rod 42. In order to apply the bottom firmly against the lower end of the can the screw 42b is loosened, the lever 42d is raised as far as possible so that the bottom is held against the can and the spring 41 is tensioned, then the rod is blocked in this position by tightening the screw 42b. For removing the bottom from the can the screw 42b is loosened, then the bracket with the rod and the bottom 10' can be swung to the side.

The following further conduits and connections are provided: a warm-water supply pipe 64 with valve 65 leading to the connection 27 of the jacket space 26, and a flexible tube 66 branched off from pipe 64 for connection with the inlet 44 of the bottom 10'; a drain pipe 67 with valve 68 branched off from connection 27; a pipe 46 with valve 47 extending from the connection 28 of the jacket space 26; an air conduit 69 leading from the top part of the can 1' beneath the water distributor via a valve 49 to the connection 28; an air conduit 50 with valve 51 leading from connection 27 to an air pump 52; a compressed-air conduit 53 with valve 54, leading from the air pump 52 to a flexible tube 55 which can be connected to the inlet 44 of the bottom 10'. The refrigerant conduit 8 is connected by a conduit 56 with valve 57 to the compressor of the refrigerating plant, and by a conduit 58 with valve 59 to the condenser of the latter. The refrigerant conduit 9 is connected by a conduit 60 with valve 61 to the condenser, and by a conduit 62 with valve 63 to the compressor.

Before a freezing cycle is started the bottom 10' is applied to the bottom end of the can, the lid 14 is opened and water is run into the can from tap 39. At the same time the refrigerant is circulated through the evaporator space 6', entering through conduit 8 and leaving through conduits 9 and 60. The water is diverted by the distributor 32 towards the walls of the can which are intensely cooled, and the first portions are nearly frozen when reaching the bottom. When the water has risen to a level corresponding more or less to the height of the evaporator space (as indicated by a dashed line), the supply of water is stopped and the lid is closed. The freezing process may now be furthered in various ways. For example, the water may be agitated by means of a current of air introduced under pressure from the pump 52 through pipe 53, the flexible tube 55, the inlet connection 44 and the hollow bottom 10', lifting the ball 38 from its seat so that it can enter the can. It leaves the latter through tube 69 and is re-circulated through connection 28, the jacket space 26, connection 27 and pipe 50 to the air pump 52. Such agitation of the water both shortens the freezing period and clarifies the ice. The return of the air through the jacket space minimizes losses of cold.

On the other hand, the freezing may be improved by setting up a state of reduced pressure within the can above the water level. For this purpose, the valves 54 and 47 are shut, and with valves 49 and 51 open, air is aspirated by the pump 52 from the can and delivered into the atmosphere without being returned into the can.

Tests have shown that with a machine according to this embodiment of the invention, a quantity of water of about 25 liters enclosed in a can of corresponding size can be completely frozen within about 1½ hours.

The harvesting of the ice cake is started by a thawing operation which loosens the cake from the walls of the can and from the bottom. For this purpose, a quantity of refrigerant may be introduced under pressure through conduits 62 and 9 into the evaporator space 6' and either be allowed to accumulate therein or to leave it without being sucked off, that is, substantially without evaporation, through conduits 8 and 58 to the condenser. At the same time with this warming of the evaporator by the refrigerant, or in its stead, a warm fluid such as hot water, steam, hot air or the like, may be introduced into the jacket space 26 through conduit 64 and connection 27, and be drained off through connection 28 and pipe 46. Similarly, a warm fluid may be introduced into the bottom through tube 66 and inlet 44 in order to be drained off through the outlet 45.

The bottom may then be lowered for collecting the cake.

With a freezing machine according to the invention it is possible to manufacture ice by a continuous process. The operation is started as described hereinbefore, the bottom being applied to the can or cans, and the latter being filled with water. When the water is frozen the ice cake is loosened, the bottom is lowered by a fraction of the height of the cake, say one third or one quarter thereof, and arrested in that position, then water is poured into the can to make up for the extruded portion of the ice cake, and freezing is started again. When the fresh portion of water is frozen, the cake is again loosened, the bottom lowered by a further fraction of the height of the can, and so forth, until the portion of the ice cake protruding beneath the can has reached the desired length. It is then severed at or near the bottom end of the can, which can easily be done by means of proper hand tools (known per se) or by a set of splitting pins, chisels or the like, arranged for automatical operation. The bottom is then raised and the cycle begins afresh.

I claim:

1. A freezing machine comprising an evaporator for a refrigerant capable of generating cold by evaporation; at least one oblong freezing can mounted upright within the evaporator and projecting therefrom at its upper and lower ends; a detachable bottom for the can; and lifting means including at least one compression spring adapted to raise and lower the bottom and to apply it with pressure to the lower end of the can.

2. A freezing machine as defined in claim 1, wherein said bottom is hollow and includes an inlet and an outlet for a warm fluid.

3. A freezing machine comprising an evaporator for a refrigerant capable of generating cold by evaporation; at least one oblong freezing can mounted upright within the evaporator and projecting therefrom at its upper and lower ends; a detachable bottom for the can; and mechanical lifting means including a pivoted bracket adapted to be swung sidewards; and a lever system mounted on said bracket, said lifting means being adapted to raise and lower the bottom and to apply it with pressure to the lower end of the can, and to swing the bottom laterally away from the can in the lowered position.

4. A freezing machine comprising an evaporator for a refrigerant capable of generating cold by evaporation; at least one oblong freezing can mounted upright within the evaporator and projecting therefrom at its upper and lower ends; a detachable bottom for the can; lifting means including at least one compression spring adapted to raise and lower the bottom and to apply it with pressure to the lower end of the can; a conduit for the evacuation of air from the top part of the can; a passage in the bottom for the inlet of air under pressure to the can; and a check valve in conjunction with said passage.

5. A freezing machine as claimed in claim 4, comprising a recirculation circuit connecting the air inlet and evacuation conduits, said circuit including an air pump and a section passing through the evaporator outside the can.

EUGEN WILBUSHEWICH.

REFERENCES CITED

The following references are of record in the file of this patent:

UNITED STATES PATENTS

| Number | Name | Date |
| --- | --- | --- |
| 63,404 | Lowe | Apr. 2, 1867 |
| 191,256 | Riker | May 29, 1877 |
| 236,471 | Windhausen | Jan. 11 1881 |
| 989,044 | Pool | Apr. 11, 1911 |
| 1,796,568 | Lee | Mar. 17, 1931 |
| 1,978,176 | Steenstrup | Oct. 23, 1934 |
| 2,105,460 | Gaugler | Jan. 11, 1938 |
| 2,359,300 | Cartwright | Oct. 3, 1944 |
| 2,361,137 | Terry | Oct. 24, 1944 |